United States Patent
Kirk et al.

[15] 3,657,965
[45] Apr. 25, 1972

[54] METHOD AND CONTROL CIRCUIT FOR EFFECTING THE SEQUENTIAL OPERATION OF MACHINE ELEMENTS

[72] Inventors: Colin John Kirk; Reginald John Bailey, both of Twickenham, Middlesex, England

[73] Assignee: Martonair Limited, Twickenham, England

[22] Filed: July 11, 1969

[21] Appl. No.: 841,080

[52] U.S. Cl. ..................................91/189, 91/461, 91/466
[51] Int. Cl. ....................................F01l 33/00, F15b 13/07
[58] Field of Search ..................60/52 HE; 91/388, 176, 189, 91/461, 466

[56] References Cited

UNITED STATES PATENTS 2,112,466   3/1938   Maloon ..............................60/52 HE
3,215,045   11/1965  Lissou...................................91/388
3,473,440   10/1969  Firth et al. ............................91/176

Primary Examiner—Paul E. Maslousky
Attorney—Mawhinney & Mawhinney

[57] ABSTRACT

For the control of machine elements, for example, in the operation of machine tools, a control circuit is provided to obtain sequential operation of the elements. The control circuit is preferably pneumatic and controls pneumatically operable elements. The circuit includes means for sensing the operative state of the machine, and two selectors indexable to a variety of positions to select energisation of the sensing means and to select machine elements for operation in the required sequence. An indexing means is arranged to index the selector means sequentially through their indexed positions.

12 Claims, 6 Drawing Figures

INVENTORS
COLIN JOHN KIRK, &
REGINALD JOHN BAILEY

BY

ATTORNEY

INVENTORS
COLIN JOHN KIRK &
REGINALD JOHN BAILEY

BY

ATTORNEY

METHOD AND CONTROL CIRCUIT FOR EFFECTING THE SEQUENTIAL OPERATION OF MACHINE ELEMENTS

The invention relates to a method of and a control circuit for effecting the sequential operation of machine elements and particularly, but not exclusively, a pneumatic control circuit for effecting the sequential operation of pneumatically operable machine elements. It is well known in the art for a machine to have various fluid-operable actuators, such as piston and cylinder units, for operating corresponding elements of the machine and for these actuators to be operated in a predetermined sequence by a control circuit utilizing sensing means for detecting from each machine operation when the next machine operation is to be initiated. However, the previously proposed control circuits suffer from a fault, which can cause damage to the machine, in that all the sensing means are always energized such that the machine operator, or the dropping of a tool, or the accumulation of waste products can accidentally cause any of the sensing means to initiate the operation of the associated machine element out of sequence. Furthermore, the hitherto proposed control circuits suffer from the necessity of having considerable numbers of auxiliary valves for ensuring that the various actuators will operate as required. Such auxiliary valves are particularly used for removing previously applied fluid pressure signals from the control valves so that an opposite fluid pressure signal will be effected. An object of the invention is to provide a simple control circuit that will mitigate these disadvantages.

According to one aspect of the invention a method of effecting the sequential operation of machine elements having respective associated sensing means for detecting from each machine operation when the next machine operation is to be initiated and for producing a corresponding signal, includes energizing at any instant only the sensing means that is to initiate the next machine operation, and applying the signal produced by the energized sensing means to initiate the operation of the machine element for performing the next machine operation in the sequence and to energize the next sensing means in the sequence and also to de-energize the sensing means that produced the signal, whereby each sensing means will be energized in turn in a predetermined desired sequence corresponding with the sequence of operations that the machine elements are to perform. Preferably the method includes applying the signal produced by at least one of said sensing means to terminate the operation of at least one of said machine elements. If desired, the signal produced by a sensing means may be applied to terminate the operation of the associated machine element. In the case where there are a greater number of sensing means than there are machine elements to be controlled and at least one of said sensing means is redundant in that there is no machine element for it to control, the method may include operating said redundant sensing means permanently to a condition in which it will produce a signal as soon as it is energized and will consequently de-energize itself and energize the next sensing means in the sequence. Preferably the method includes applying the signal produced by each sensing means to operate an indexing device for causing the operation of the next machine element, for energizing the next sensing means in the sequence, and for deenergizing the sensing means that produced the signal. In the case where each sensing means is energized by the application of fluid pressure and produces a fluid-pressure signal, the method may include applying each fluid-pressure signal to operate the indexing mechanism thereby disconnecting the supply of fluid pressure from the sensing means that produced the fluid-pressure signal and connecting the supply of fluid pressure to the next sensing means in the sequence.

In the case in which it is desired to break the sequence in which the sensing means and their associated machine elements are arranged whereby different sequences or random sequences of operation of the machine elements may be achieved, the method may include operating every sensing means that is not required in the desired sequence to a condition in which it will produce a signal as soon as it is energized and will consequently de-energize itself and will energize the next sensing means in the arranged sequence until eventually the next machine element required to provide the desired sequence and the associated sensing element will be energized, and preventing each machine element not required in the desired sequence from being operated during the short period that its associated sensing means is energized. Preferably the method includes applying the signal produced by a sensing means associated with a machine element that is not required in the desired sequence to prevent the operation of the associated machine element. The method may include moving a control tape means associated with said sensing means to a position in which it will operate every sensing means that is not required in a desired sequence to a condition in which it will produce a signal as soon as it is energized. In this latter case the method preferably includes moving said control tape means to a different significant position whenever the selected sequence is to be changed.

According to another aspect of the invention a control circuit, for effecting the sequential operation of machine elements, has sensing means arranged for detecting from each machine operation when the next machine operation is to be initiated and for producing a corresponding signal, a first selector means is indexable to a variety of positions such that in each indexed position the first selector means selects only one sensing means for energization, the indexed positions of the first selector means taken sequentially correspond with the selection of the sensing means in the required sequence, a second selector means is indexable to a variety of positions such that in each indexed position the second selector means selects at least one machine element for operation, the indexed positions of the second selector means taken sequentially correspond with the operation of the machine elements in the required sequence, an indexing means is arranged to index the first and second selector means sequentially through their indexed positions, and the indexing means is arranged to be operated whenever a sensing means produces a signal corresponding to the detection that the next machine operation is to be initiated whereby the first and second selector means will be indexed to their next sequential indexed positions for initiating the next machine operation and for energizing the next sensing means in the sequence and also to de-energize the sensing means that produced the signal. If desired, the second selector means when indexed from a first position to a second position may be arranged to terminate the operation of a machine element that was operating while the second selector means was at its said first position. Preferably each sensing means is a detector hole arranged to be blocked by the associated machine element when the latter is in a position at which the next machine operation is to be initiated, the first selector means is arranged to connect a low pressure fluid supply sequentially to the detector holes, a valve means is arranged to be actuated when a fluid pressure signal of a predetermined pressure is received, the valve means is arranged on actuation to operate the indexing means, and the low pressure fluid supply is connected for actuating the valve means whenever a selected detector hole is blocked by its respective machine element such that the pressure of the low pressure fluid supply will increase to the aforesaid predetermined pressure. At least one detector hole may be constituted by a plurality of interconnected detector holes which must all be covered by the respective machine element while connected to the low pressure fluid supply before the pressure of the latter can attain the said predetermined pressure. The low pressure fluid supply is preferably derived through a flow restrictor.

The machine elements are preferably operated by fluid-operable actuators controlled by respective control valves which are arranged to be actuated when a fluid pressure signal is received, and the second selector means is arranged to apply a fluid pressure signal from a fluid pressure supply sequentially to the control valves. In the case where the fluid-operable actuators are double acting, the control valves are preferably reversing valves connecting their corresponding actuators reversibly to a fluid pressure supply and to exhaust, and each reversing valve is operable to one condition when a fluid pressure signal is applied from the second selector means through a first duct and to the reverse condition when a fluid pressure signal is applied from the second selector means through a second duct.

Preferably the first and second selector means are drivingly interconnected and the indexing means is a single indexing mechanism for indexing the first and second selector means as a single unit. The indexing mechanism may comprise a ratchet for moving the first and second selector means through their indexed positions, a pawl for indexing the ratchet, and a fluid-operable actuator for reciprocating the pawl such that each reciprocation provides one indexing movement.

In the case where there are a greater number of sensing means than there are machine elements to be controlled and a least one of said sensing means is redundant in that there is no machine element for it to control, the redundant sensing means may be permanently operated to a condition in which it will produce a signal as soon as it is energized by said first selector means and will consequently operate the indexing means to index the first and second selector means to their next indexed positions.

In the case where the first selector means has more indexed positions than are required for connection to the sensing means, the indexing means may be arranged to repeat index the first and second selector means past the redundant indexed positions. When the sensing means are detector holes, the redundant indexed positions are preferably blocked so that an indexing signal will be generated as soon as a redundant indexed position is reached, and the indexing means is arranged to re-cock itself after every indexing movement. In the case where the indexing means includes a double acting fluid-operable actuator controlled by a reversing valve in response to the back pressure caused by the blocked detector holes, the low pressure fluid supply for the detector holes is preferably derived through a flow restrictor from a line which interconnects the actuator and the reversing valve for re-cocking the indexing means.

Preferably the first and second selector means are provided by a fluid distribution valve which includes a spindle supporting a rotor, a first passage formed in the spindle and communicating with a first annular gallery defined between the spindle and the rotor, a second passage formed in the spindle and communicating with a second annular gallery defined between the spindle and the rotor and axially spaced from the first annular gallery, sealing means arranged to inhibit the leakage of fluid from the two annular galleries between the rotor and the spindle, a non-rotary member defining first and second circular series of spaced ports, a first passage formed in the rotor and communicating between the first annular gallery and any selected port of the first series, a second passage formed in the rotor and communicating between the second annular gallery and any selected port of the second series, further sealing means arranged operatively between the rotor and the non-rotary member for inhibiting fluid leakage from the first and second rotor passages between the rotor and the non-rotary member, the first spindle passage together with the first annular gallery and the first rotor passage and the first series of ports constitute the first selector means, the second spindle passage together with the second annular gallery and the second rotor passage and the second series of ports constitute the second selector means, and the said indexing means is arranged to rotate the rotor relatively to the non-rotary member in angular increments for connecting the first and second spindle passages respectively to different ports in the first and second series. Such a fluid distribution valve is the subject of our patent application No. 841081, now U.S. Pat. No. 3,554,224.

In the case in which it is desired to break the sequence in which the sensing means and their associated machine elements are energized by the indexing of said first and second selector means whereby different sequences or random sequences of operation of the machine elements may be achieved, a control means may be provided for operating every sensing means that is not required in the desired sequence to a condition in which it will produce a signal as soon as it is energized by said first selector means and will consequently repeat operate the indexing means to index said first and second selector means until eventually the next machine element required to provide the desired sequence and the associated sensing element will be energized, and inhibitor means for preventing each machine element not required in the desired sequence from being operated during the short period that its associated sensing means is energized. In such a case and when the sensing means are detector holes, the control means may be arranged to block the unrequired detector holes so that an indexing signal will be generated as soon as the first selector means is indexed to supply fluid pressure to a blocked detector hole, and the indexing means is arranged to re-cock itself after every indexing movement. Preferably the indexing means includes a double acting fluid operable actuator controlled by a reversing valve in response to the back pressure caused by the blocked detector holes, and said indexing means is arranged at the end of its indexing stroke to operate a valve means to vent the pressure signal from the blocked detector whereby said reversing valve will cause said fluid-operable actuator to re-cock said indexing means. Furthermore the inhibitor means may be operated by the signal produced by the associated sensing means.

In the case where the sensing means are energized by the application of fluid pressure through said first selector means and the signal produced by each energized sensing means is a fluid pressure signal, in which the machine elements are operated by the application of fluid pressure from a source through said second selector means, and the inhibitor means is provided by a valve device which is arranged to interrupt the supply of fluid pressure from source to said second selector means whenever an energized sensing means produces its said fluid pressure signal. Preferably said control means is a control tape means which is associated with said sensing means and is movable to a position in which it will operate every sensing means that is not required in a desired sequence to a condition in which it will produce a signal as soon as it is energized. Drive means may be provided for moving said control tape means to a different significant position whenever the selected sequence is to be changed. In the case where the sensing means are detector holes, the control tape means may be a punched tape operatively associated with said selector holes whereby the unrequired selector holes are blocked by unpunched portions of the punched tape and the required selector holes are aligned with corresponding punched holes in the punched tape.

The invention is now described, by way of example only, with reference to the accompanying drawings, in which.

Figure 1:
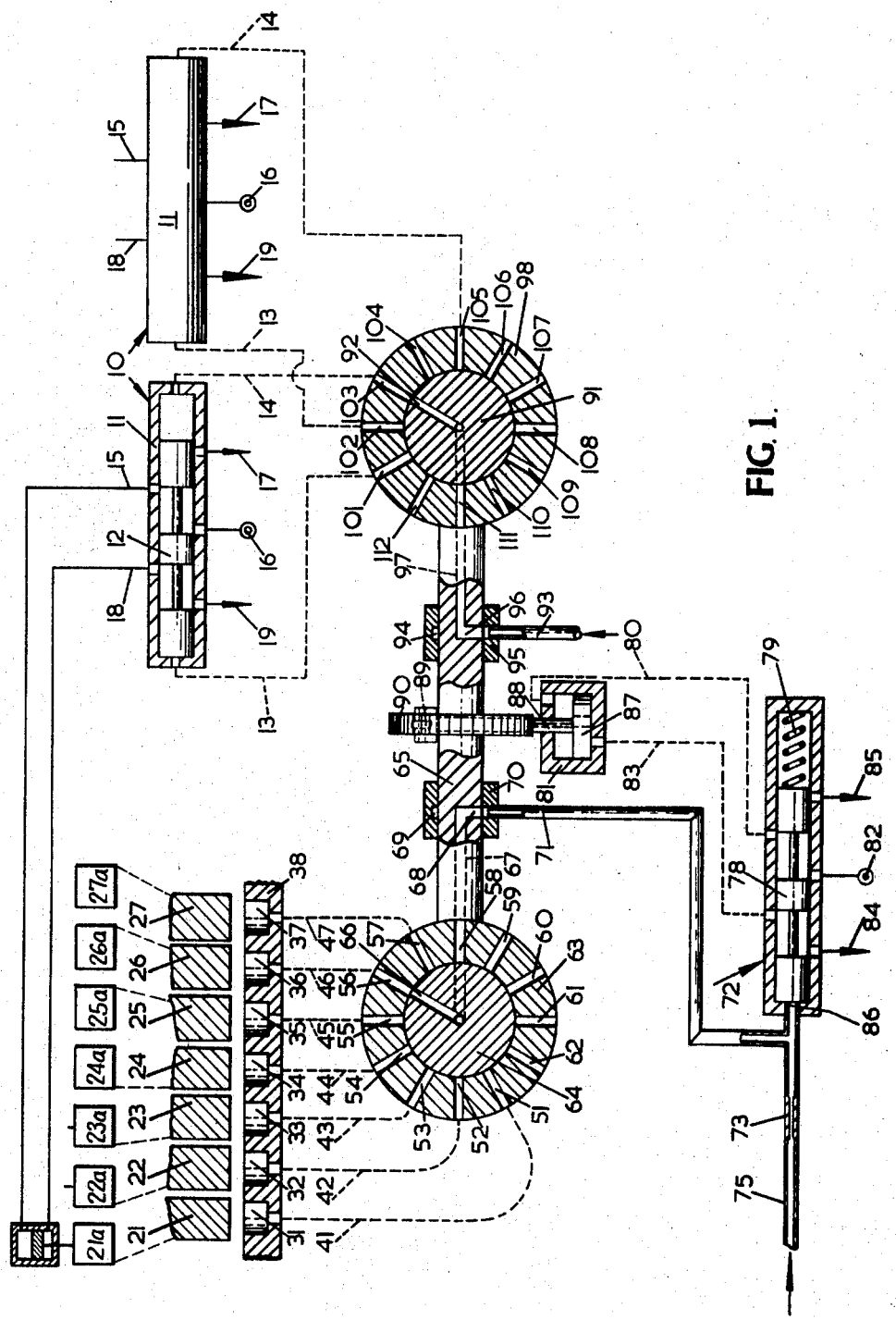
FIG. 1 is a diagram illustrating a pneumatic control circuit.

With reference to the pneumatic circuit illustrated in FIG. 1, a plurality of machine elements are operated by pneumatic double-acting rams, of which only one is shown, which are controlled by a corresponding number of five port spool valves 10 of which only two are shown. Each spool valve 10 is shown diagrammatically and is already well-known in the art.

However, so that the operation of the circuit can be fully understood, it should be noted that each spool valve 10 generally comprises a casing 11 which sealingly supports for axial sliding a three landed spool member 12 which can be moved to the right from the position shown by applying a pulse of compressed air through a control line 13, or can be returned to the position shown by applying a pulse of compressed air through a control line 14. With the spool 12 in the leftward position shown, it connects a line 15 to a compressed air supply 16 while blocking an exhaust 17 and connecting a line 18 to another exhaust 19 — the lines 15 and 18 are connected to opposite ends of one of the pneumatic double-acting rams and the application of the compressed air supply 16 through the line 15 causes the ram to move the corresponding machine element in one direction. On the other hand, movement of the spool 12 to the right causes the exhaust 19 to be blocked while the line 18 is connected to the compressed air supply 16 and the line 15 is connected to the exhaust 17 — consequently the exhaust and supply connection to the associated pneumatic ram are reversed so that the corresponding machine element will be moved in the opposite direction. If desired, rotary pneumatic actuators or diaphragm actuators may be used in conjunction with spool valves 10. Furthermore, single acting rams or the like could be used and be operated by three port valves as is well-known in the art, only one control line being necessary. Fundamentally the spool valves 10, whether of the five port or the three port or another type, are utilized for applying compressed air from a high pressure supply 16 to operate pneumatic actuators whenever a pressure signal is received along the appropriate control line such as the control lines 13 and 14. This technique is well-known in the art and has the advantages that, while the various pneumatic actuators can be operated under high pressures, the control circuit can be a low pressure system with consequent savings in the power utilized for operating the control circuit and in the capital cost of the control circuit components.

With previously proposed pneumatic circuits employing this technique, sensing means in the form of mechanically-operable pneumatic valves or detector holes or electro-pneumatic valves have been employed for generating the pressure signals for application to the five port valves 10 or other valves that may be required, and the pressure sensitive valves and one-way valves have been utilized to ensure that the actuators were actuated in the desired sequence. However, all of these sensing means are always energized with a resulting inherent power loss and the danger that one of the sensing means will be accidentally operated out of sequence and will therefore cause at least one of the machine elements to operate out of sequence with resulting damage and also difficulty in setting the machine back to its original sequence. Furthermore, to enable these previously proposed circuits to work, auxiliary valves are required for removing previously applied fluid pressure signals from the control valve so that an opposite fluid pressure signal will be effective.

For sensing means we prefer to use a detector hole system in which air under low pressure is allowed to leak from a hole which will become blocked by the corresponding machine element or by a member fast therewith when the next operation is to be initiated, and the blocking of the detector hole causes a resulting back pressure to be generated — this back pressure is used as the pressure signal for initiating the next operation. Accordingly in FIG. 1 will be seen seven stops, 21, 22, 23, 24, 25, 26 and 27 which are independently carried by different machine elements 21a, 22a, 23a, 24a, 25a, 26a and 27a, respectively such that they will block corresponding detector holes 31, 32, 33, 34, 35, 36 and 37 when their associated machine elements have reached a point when the next machine operation is to be initiated. The detector holes are shown for convenience formed in a single casing 38, but it should be understood that each detector hole can be arranged in any convenient position in a stationary or movable machine element, and the stops may be used either to abut the casing 38 or equivalent machine element to serve additionally as a dead stop, or may slide along the casing 38 to cover the respective detector hole or holes. Each detector hole 31, 32, 33, 34, 35, 36 and 37 is connected by a respective line 41, 42, 43, 44, 45, 46 and 47 to a corresponding port 51, 52, 53, 54, 55, 56 and 57 in a non-rotary casing 63. As shown, the latter is also provided with unconnected ports 58, 59, 60, 61 and 62 for use with any other detector holes there may be. The ports 51 to 62 are radially directed in the non-rotary casing 63 for coaction with a rotor 64 which is driven by an integral shaft 65 and has a single radial passage 66 which can be aligned with only one of the ports 51 to 62 at any instant. The radial passage 66 is connected by an axial bore 67 formed in the shaft 65 to a radial passage 68 which is in constant communication with an annular gallery 69 formed in a casing 70 sealingly surrounding the shaft 65. A line 71 connects the gallery 69 to a five port valve 72 and, through a restricting orifice 73, to a low pressure air supply line 75. The rate at which the air can flow through the line 71 from the supply line 75 is severely limited by the orifice 73 which causes a pressure drop provided that air can flow freely along the line 71, through the gallery 69 and the radial passage 68, the axial bore 67 and the radial passage 66, and through whichever of the ports 51 to 62 is selected and the associated detector hole.

The five port valve 72 is similar to the five port valve 10 but has its spool 78 permanently biased to the left in FIG. 1 by a compression coil spring 79 so that a line 80 connected to the top end of a cylinder 81 is usually connected to a high pressure compressed air supply 82, a line 83 connected to the bottom end of the cylinder 81 is usually connected to an exhaust 84, and a further exhaust 85 is blocked. The line 71 is connected through a port 86 to act on the left hand end of the spool 78, but the lower air pressure acting in the line 71 when it is connected to an unblocked detector hole is insufficient for moving the spool 78 against the spring 79. However, as soon as the detector hole 31 to 37 that is connected to the port 51 to 62 that is in communication with the radial passage 66 is closed by its corresponding stop 21 to 27, the air flow along the line 71 will stop and accordingly the flow of air through the orifice 73 will cause the pressure in line 71 to rise rapidly to the pressure of the low pressure supply 75. As soon as the pressure in the line 71 rises due to the connected detector hole being blocked, the spool 78 is moved to the right in FIG. 1 whereby to reverse the connections to the lines 80 and 83. A piston 87 coacts with the cylinder 81 and is connected by a connecting rod 88 to a pawl 89 for driving a ratchet wheel 90 secured to the shaft 65. Thus, whenever the pressure rises in the line 71 due to the connected detector hole being blocked, air pressure is applied through line 83 to urge the piston 87 upwards such that the pawl 89 will index the ratchet 90 to its next position. The number of teeth on the ratchet is arranged to be the same as the number of radial ports 51 to 62 in the non-rotary casing 63, and the radial passage 66 in the rotor 64 is so disposed relatively to the ports 51 to 62 and the teeth of the ratchet 90 such that it will be opposite one of the ports 51 to 62 at each indexed position of the ratchet 90. Thus, as soon as the detector hole connected to the line 71 has been blocked, the shaft 65 will be indexed so that the radial passage 66 will become aligned with the next detector hole which would be normally unblocked — accordingly the pressure in the line 71 will drop again so that the spring 79 in the five port valve 72 will return the spool 78 to the left in FIG. 1, thereby restoring the original connections to the lines 80 and 83 whereby the piston 87 will be withdrawn to the position shown thus re-cocking the pawl 89. If a plurality of operating conditions must be achieved before the next machine operation is to be signalled, a corresponding plurality of detector holes may be used for detecting these operating conditions and may be connected to an appropriate one of the ports 51 to 62 so that the pressure in line 71 will not build up to a sufficient value for operating the spool valve 72 until all of the detector holes for detecting the achievement of the plurality of machine operations have been blocked.

It will be appreciated that the circuit shown in FIG. 1 as described to this point provides a means for energizing only the detector hole or holes that are required for detecting when the next sequential operation is to be initiated and that, as soon as the initiation of the next sequential operation has been signalled, the detector hole or holes for detecting when the subsequent sequential operation is to be initiated will be energized. Furthermore this sequential energization of only the next detector hole or holes that are required is achieved by a single valving device in the form of the non-rotary casing 63 and the rotor 64, and the indexing system comprising the spool valve 72 and the piston-operated pawl 89 is energized by whichever detector hole or holes is selected by the rotor passage 66. In this manner it is impossible to cause the machine elements to be operated accidentally out of sequence as the detector holes for operating the machine elements non-sequentially are not energized, and the only malfunction that could take place would be for the next machine operation to be initiated prematurely by accidentally blocking the energized detector hole or holes — this type of malfunction can be eliminated entirely by the use of a plurality of detector holes for detecting when each machine operation is to be initiated, and by arranging these detector holes so that it is physically impossible for the machine operator to cover them all at the same time by accident. Furthermore, as only the detector holes required for initiating the next machine operation are energized, the remaining detector holes are not connected to the compressed air supply 75 and there will be a substantial saving in the power required for the control circuit.

However, although the circuit described so far will automatically energize the detector holes in the appropriate sequence, it is necessary to identify the selection of the detector holes with the energization of the various actuators for operating the machine elements so that, while each actuator is operating, the detector hole or holes for initiating the next machine operation are energized. This is achieved by means of a second rotor 91 which is driven by the shaft 65 in unison with the first rotor 64.

The second rotor 91 is substantially identical with the first rotor 64 and has a radial passage 92 supplied with compressed air from a supply line 93 which communicates with an annular gallery 94 formed in a casing 95 sealingly surrounding the shaft 65, and the annular gallery 94 is connected with the radial passage 92 in the second rotor 91 by means of a radial passage 96 and an axial connecting passage 97 formed in the shaft 65. The second rotor 91 is a rotary sealing fit in a non-rotary casing 98 which is provided with a series of radial ports 101, 102, 103, 104, 105, 106, 107, 108, 109, 110, 111 and 112 for connection to the various control lines required for controlling the operation of the actuators. As shown, the ports 101, 102, 103 and 105 are connected to the control lines 13 and 14 for the two spool valves shown such that, assuming clockwise rotation of the second rotor 91 from a position in which the radial passage 92 communicates with the port 101, the actuator associated with the left hand spool valve 10 will first be operated in one direction, when the radial passage 92 communicates on the first indexing of the shaft 65 with the port 102 the actuator associated with the right hand spool valve 10 will then be operated in one direction, on the second indexing so that the radial passage 92 communicates with the port 103 the actuator associated with the left hand spool valve 10 will be operated in the reverse direction, on the third indexing so that the radial passage 92 communicates with the port 104 an unshown spool valve and corresponding actuator associated with this port will be operated, on the fourth indexing so that the radial passage 92 communicates with the port 105 the actuator associated with the right hand spool valve 10 will be operated in the reverse direction, and so on.

It will accordingly be appreciated that each indexed position of the shaft 65 corresponds with the alignment of the radial passage 92 in the second rotor 91 with a port 101 to 112 for operating an actuator to cause one machine operation, and additionally corresponds with the alignment of the radial passage 66 in the first rotor 64 with a port 51 to 62 that selects the detector hole or holes for initiating the next machine operation. Although the sequence of selection of the ports 51 to 62 by the radial passage 66 in the first rotor 64 will always bear a fixed relationship to the sequence of selections of the ports 101 to 112 by the radial passage 92 of the second rotor 91, it should be appreciated that the lines connecting the ports 51 to 62 to the detector holes and the lines connecting the ports 101 to 112 to the valves for operating the actuators may be arranged in such a way as to provide any desired sequence of machine operations. For instance, any of the ports 101 to 112 may be used to operate more than one actuator if so desired — it should also be noted that the various machine operations are readily overlapped by connecting the control lines 13 and 14 from the spool valves 10 to the appropriate ports 101 to 112 with the required phasing or, alternatively, a particular machine operation can be stopped before the next machine operation starts by connecting the control lines 13 and 14 to sequentially adjacent ports 101 to 112. Thus the sequence of operation of the various actuators is determined solely by the relative connections of the corresponding spool valves 10 to the ports 101 to 112. If all of the available ports 51 to 62 are not required, it will be necessary to repeat index the rotors 64 and 91 past the redundant indexed positions until a port connected to a detector hole is reached and it will also be desirable to block those ports 101 to 112 which correspond with a redundant port 51 to 62 to prevent wastage of air from the supply line 93. To obtain a repeat indexing signal from the redundant indexed positions is quite simple as all that is required is the permanent blocking of each redundant port, for instance, by a screwed plug. However a difficulty is encountered with the arrangement shown in that the pawl 89 must be re-cocked before the signals from the redundant ports will be effective. It is therefore necessary to provide an indexing arrangement which would re-cock itself automatically after each indexing operation. This can be achieved by supplying line 75 from line 80 whereby, as soon as the spool valve 72 has been operated by increased pressure in line 71 to reverse the connections to lines 80 and 83, the pressure in line 71 will drop through the restrictor 73 and the line 80 to exhaust through exhaust port 85. In this manner the valve 72 will then change the connections to the lines 80 and 83 once again. For this system to work satisfactorily, the orifice 73 will have to be designed very carefully to prevent the spool valve 72 from hunting or from returning to its leftward position before the pawl 89 has completed its indexing stroke. As will be appreciated by those skilled in the art of fluid circuits, there are several other ways in which the pawl 89 can be made to re-cock automatically after each indexing operation. However, we prefer to use the new fluid circuit illustrated in FIGS. 5 and 6 which are described later.

If desired, the spool valves 10 may be arranged to control liquid operable rams and could then be operated either pneumatically or by liquid under pressure. Similarly, the detector holes 31 to 37 could utilize the escape of liquid rather than a gas as described. Also, if desired, the spool valves 10 or their equivalent may be omitted and the second rotor 91 and associated non-rotary casing could be used to supply directly the various actuators for the machine elements — this would mean that the passages 92, 96 and 97 and the ports 101 to 112 would have to take the full pressure and fluid flow required by the various actuators. However, this would be quite acceptable if the actuators were of low capacity and low power. Furthermore, if desired, the first and second rotors 64 and 91 need not be interconnected by the shaft 65 and could be driven separately, for instance, by two indexing mechanisms such as the pawl 89 and ratchet 90 which could be driven by independent pistons 87 with associated spool valves 72, the only necessary connection being a line connecting the line 71 to the second spool valve 72. Although the invention has been described specifically with reference to the preferred use of detector holes as sensing devices, it should be understood that other known types of sensing devices could be used in an analogous manner if so desired.

Figure 2:
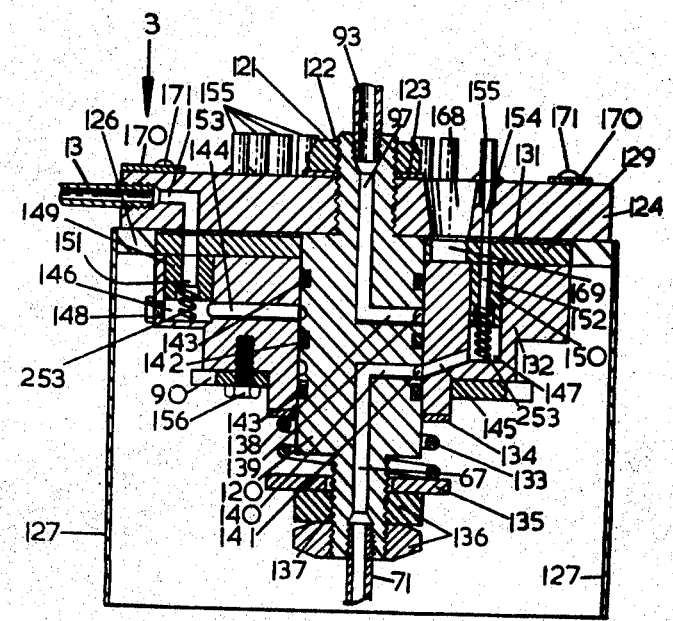
FIG. 2 is a section through a fluid distribution valve for use in the circuit shown in FIG. 1, but taken along the section line 2—2 in FIG. 3.
Figure 3:
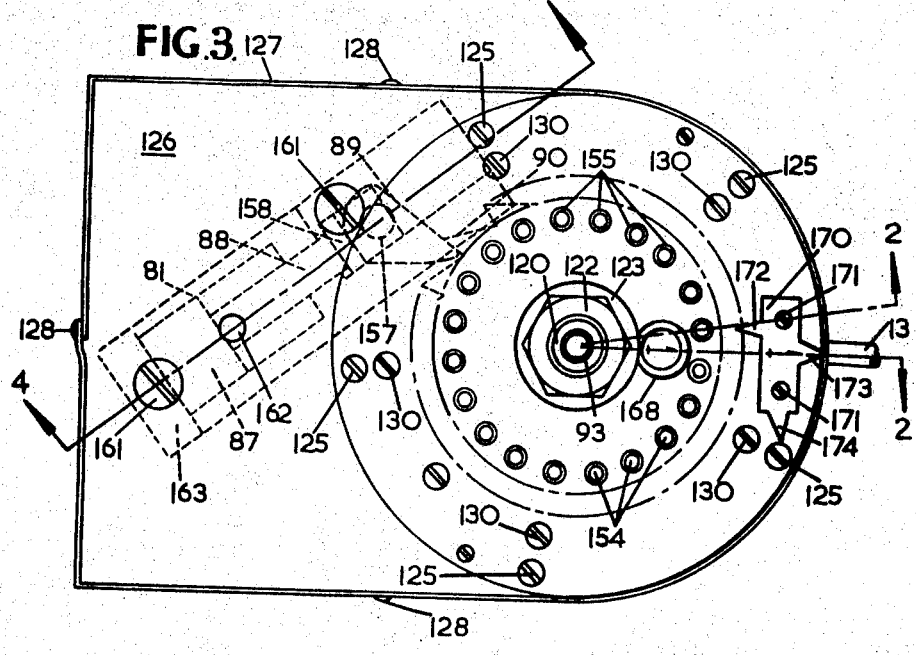
FIG. 3 is a plan view of the fluid distribution valve as if taken along the arrow 3 in FIG. 2.
Figure 4:
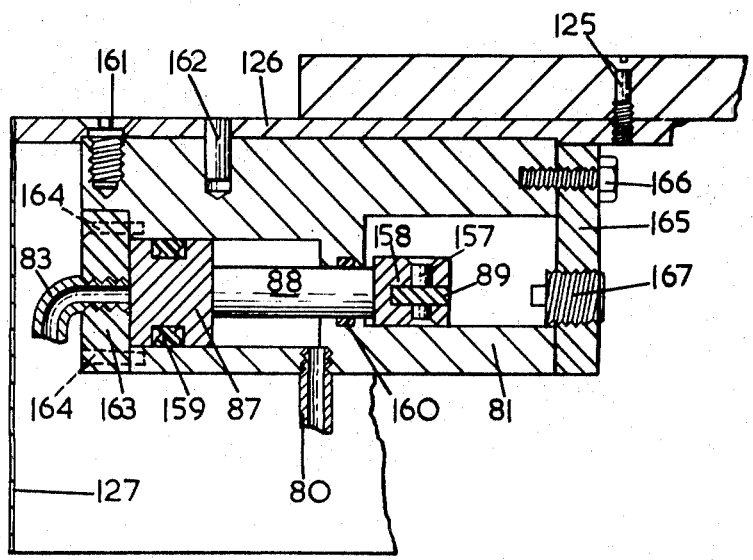
FIG. 4 is a scrap section taken along the section line 4—4 in FIG. 3.

Despite the various constructions that are conceivable for the successful operation of the circuit shown in FIG. 1, we prefer the construction which is illustrated in FIGS. 2 to 4 and which also forms the subject of our U.S. Pat. application No. 841,081

With reference to FIGS. 2 to 4, a spindle 120 is the equivalent of the aforementioned shaft 65 and has its top end as seen in FIG. 2 secured by screw threads 121, a nut 122 and an intervening washer 123 to a non-rotary casing 124. The latter is secured by an outer ring of six screws 125 to a bracket 126 which supports a skirt 127 of sheet metal, for shrouding the moving parts, by means of a number of peripherally arranged screws 128. A brass wear plate 129 lies in a circular aperture formed in the bracket 126 and is secured to the non-rotary casing 124 by an inner ring of screws 130 with an intervening paper gasket 131. A rotor 132 is journalled directly on the spindle 120 and is urged towards the wear plate 129 by a compression coil spring 133 which reacts between a thrust washer 134 abutting the rotor 132 and a washer 135 which bears against a pair of lock nuts 136 engaging screw threads 137 at the foot of the spindle 120 so that the load applied by the spring 133 can be adjusted by manipulating the lock nuts 136.

The aforementioned compressed air supply line 93 is screwed into the top of the spindle 120 and communicates with the aforementioned axial passage 97 which leads through a radial passage 138 into an annular gallery 139 formed in the periphery of the spindle 120. The previously mentioned air supply line 71 is screwed into the bottom of the spindle 120 and communicates with the aforementioned axial passage 67 which leads through a radial passage 140 into an annular gallery 141 which is also formed in the periphery of the spindle 120 but is axially spaced from the gallery 139. The galries 139 and 141 are isolated from each other by means of an intermediate sealing ring 142 and leakage from the galleries 139 and 141 between the spindle 120 and the rotor 132 is inhibited by two further sealing rings 143.

The rotor is formed with two substantially radial passages 144 and 145 which lead respectively from the galleries 139 and 141 to bores 146 and 147 which are parallely spaced from the axis of rotation of the rotor 132 and are arranged such that the radial distance between the bore 146 and the rotational axis of the rotor is greater than the radial distance between the bore 147 and the rotational axis of the rotor. The passage 145 is slightly inclined so that it can be drilled through the main axial bore in the rotor, but the passage 144 is drilled radially from the outer surface of the rotor 132 through the bore 146 and its outer portion is then sealed by a screwed plug 148. The bores 146 and 147 support for axial sliding respective nylon plungers 149 and 150 which are provided with axial bores 151 and 152 and are urged into sealing engagement with the wear plate 129 by compression coil springs 253. Due to the compressed air applied to the supply lines 71 and 93, compressed will also be acting on the under faces of the nylon plungers 149 and 150 thereby exerting a supplemental force urging them into sealing engagement with the wear plate 129.

The bore 151 in the plunger 149 is at the same radius as a first circular series of ports 153 which are formed through the wear plate 129, the gasket 131 and the non-rotary casing 124, and communicate with the various control lines such as the control line 13 shown in FIGS. 2 and 3. Although only one of the ports 153 is shown in the drawings, the remaining ports in the first circular series are identical in form, and lead to control lines in the same manner as the ports 101 to 112 shown in FIG. 1. On the other hand, the bore 152 in the plunger 150 is at the same radius as a second circular series of ports 154 which extend through the wear plate 129, the gasket 131 and the non-rotary casing 124 where they spigotally coact with tubes 155 which are brazed in position and are for connection through the lines 41 to 47 shown in FIG. 1 to the detector holes 31 to 38. As shown in FIG. 3 there are twenty of the tubes 155 leading from the equi-spaced ports 154 of the second series and the single control line 13 from the ports 153 that has been shown is staggered relatively to the tubes 155 — however the first series also has twenty ports 153 which are equi-spaced and staggered relatively to the second series of ports 154.

The bores 146 and 147 in the rotor 132 are so positioned that whenever the axial bore 151 in the nylon plunger 149 communicates with a selected one of the first series of ports 153, the axial bore 152 in the nylon plunger 150 will communicate with a corresponding one of the second series of ports 154. As with the diagrammatic arrangement shown in FIG. 1, the rotor 132 is indexed to select the appropriate ports 153 and 154 by means of a ratchet 90 which is held fast with the rotor 132 by a bolt 156 and is indexed by a coacting pawl 89. The latter is pivoted by a rivet 157 to a clevis 158 formed at the end of the connecting rod 88 as will be seen from FIGS. 3 and 4. The other end of the connecting rod 88 is secured to the piston 87 which coacts with the cylinder 81 and is provided with a peripheral double-acting sealing ring 159, and a further sealing ring 160 is arranged around the connecting rod 88 intermediate the piston 87 and the clevis 158. The cylinder body 81 is secured to the underside of the bracket 126 by means of two screws 161 and a positioning dowel 162, and the bore in which the piston 87 works is sealed by an end plate 163 which is held in place by four screws 164 two of which are shown in FIG. 4 and serves as a connecting member for the line 83. The remaining line 80 is secured to the cylinder body 81 at the opposite end of the piston 87 to the line 83, and the lines 80 and 83 will be alternatively connected to the compressed air supply 82 and the exhaust 84 or 85 to cause the piston 87 to reciprocate so that the pawl 89 will index the ratchet 90 according to the progress of the machine operations in the predetermined sequence.

So that the indexing movement of the pawl 89 can be regulated, a plate 165 is secured to the cylinder body 81 by a screw 166 and carries an adjustable screwed stop 167 for limiting the travel of the pawl 89 during its indexing stroke. With reference to FIGS. 2 and 3, it will be seen that the non-rotary member 124 is formed with an aperture 168 which leads through a corresponding aperture in the gasket 131 and an aperture 169 in the wear plate 129 to the top surface of the rotor 132. The latter is provided with a setting index "1" in a particular significant position such that, when this index can be viewed through the apertures 168 and 169, a plate 170 secured to the top face of the non-rotary member 124 by a pair of screws 171 and also bearing the index "1" indicates with a pointer 172 as shown in FIG. 3 the port 154 that is connected to the radial rotor passage 145, and with a pointer 173 the port 153 that is connected to the radial rotor passage 144. A further pointer 174 defined by the plate 170 indicates the direction in which the rotor 132 is driven by the pawl 89 and the ratchet 90.

Although the non-rotary member 124 and its associated wear plate 129 are arranged to abut one axial end of the rotor 132, they could be arranged annularly about the rotor 132 as indicated with the rotors 64 and 91 in FIG. 1 if so desired.

Although the embodiment illustrated in FIGS. 2 to 4 is provided with twenty ports in each of the first and second series, it will be appreciated that the numbers of ports could be readily varied to suit requirements provided the number of ratchet teeth are similarly altered. However, it would be impracticable to manufacture a series of valves having only one port difference and it would therefore be advisable to produce a series of valves in which the numbers of ports vary in increments of, say, five ports. In use any redundant ports could be blocked off and the indexing pawl 89 could be arranged to repeat index past such redundant positions in the aforementioned manner.

Figure 6:
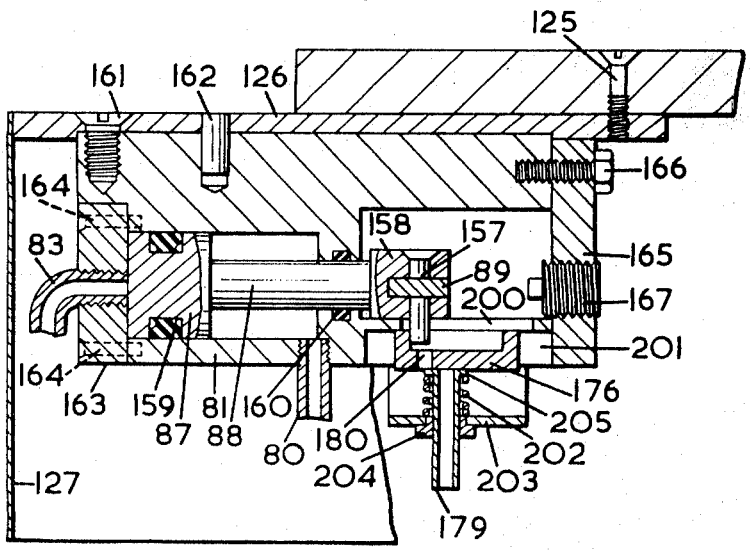
Figure 5:
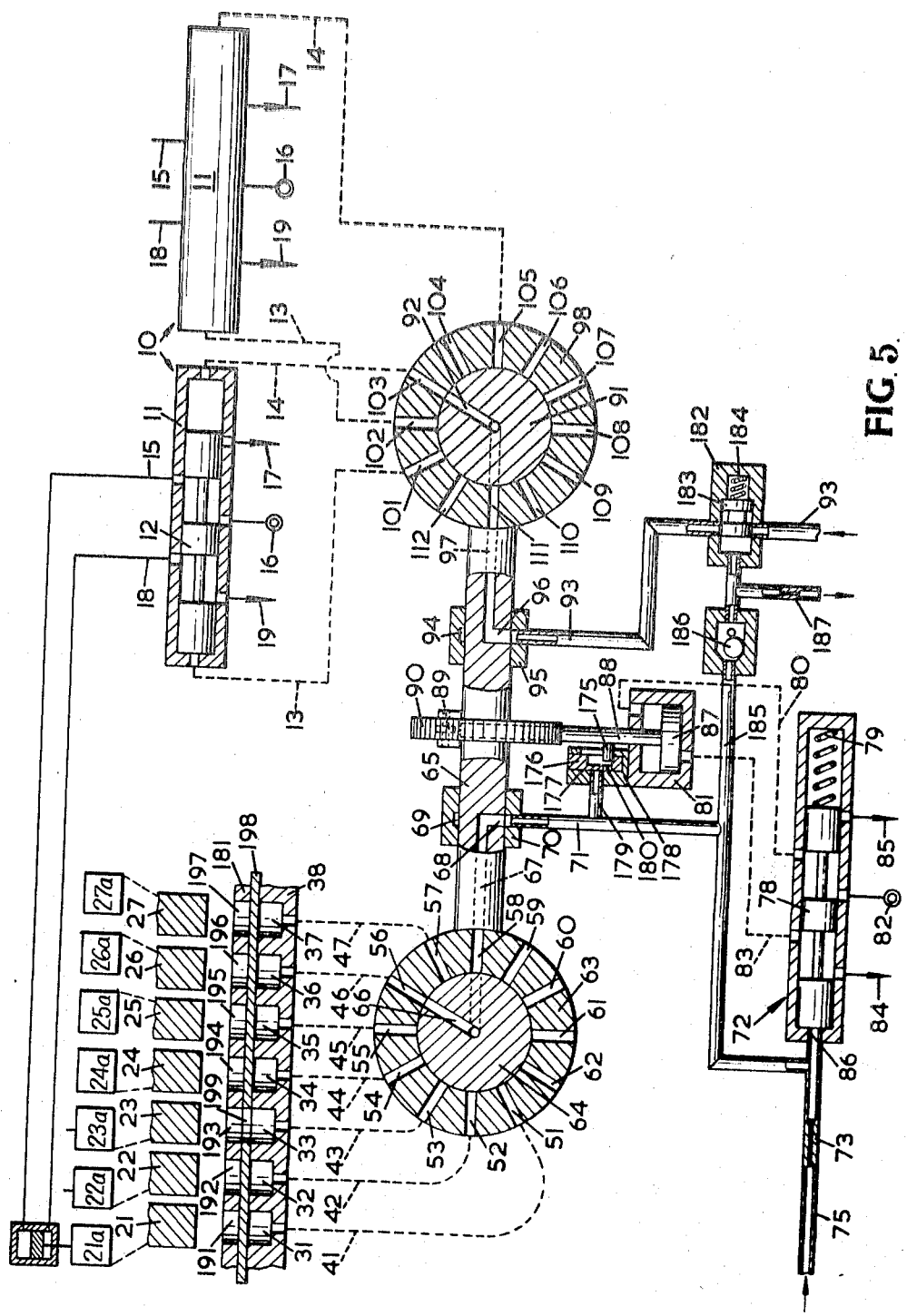
FIG. 5 illustrates a modification of the pneumatic control circuit shown in FIG. 1, and FIG. 6 corresponds with FIG. 4 after modification to a form suitable for use with the modified control circuit shown in FIG. 5.

FIGS. 5 and 6 illustrate modifications of the arrangements already described with reference to FIGS. 1 and 4. Accordingly there are a large proportion of common components which have been allocated the same reference numerals and may be assumed to have the function already described.

In particular FIGS. 5 and 6 illustrate repeat indexing embodiments, and FIG. 5 additionally shows a modification in the control of the detector holes 31 to 38 which is described later.

In FIG. 5 repeat indexing is achieved by means of a radial pin 175 which is secured to the connecting rod 88 and drives a slide valve 176 arranged operatively in a slot 177 formed in a bracket 178 secured to the cylinder 81. A line 179 connects the line 71 permanently to the slot 177 which is usually blocked by the slide valve 176. However, whenever the pressure in the line 71 rises to operate the spool valve 72 for connecting the high pressure air supply 82 to the underside of the piston 87 for indexing the shaft 65, the radial pin 175 will move upwards in FIG. 5 until the lost motion is taken up and the slide valve 176 is lifted into a position in which the line 179 is connected to exhaust through a port 180 formed in the slide valve 176. It will be noted that the port 180 is only aligned with the line 179 when the piston 87 reaches the end of its upward travel and serves to exhaust the line 71 so that the spool valve 72 will reverse the connections to the piston 87 thereby re-cocking the pawl 89. In this manner, each time the shaft 65 is indexed by the piston 87 operating the pawl 89, the line 71 will automatically be exhausted through the line 179 and the port 180 so that the pawl 89 will be re-cocked and the line 179 will be closed again by the slide valve 176. If the detector hole just selected by the indexing movement of the pawl 89 is blocked, the pressure will again rise in the line 71 so that the shaft 65 will be repeat indexed until the line 71 is connected to an unblocked detector hole.

Accordingly, if all the detector holes connected to the ports 51 to 62 are blocked, the shaft 65 will be rotated continuously and forms a type of air motor. However the rotation would not be smooth due to the action of the pawl 89, and the shaft 65 would be rotated continuously in increments — with the twelve ported arrangement illustrated, each increment would be of 30°.

This continuous incremental rotation of the shaft 65 is of great value for the purposes of automatic selection as the shaft 65 will continue to rotate until the radial passage 66 is connected to an unblocked detector hole thereby producing a completely different or random sequence. For instance, as shown in FIG. 5, a casing 181 may be parallely spaced from the casing 38 and be provided with holes 191, 192, 193, 194, 195, 196 and 197 coaxially aligned respectively with the detector holes 31 to 37. A punched tape 198 is arranged between the casings 38 and 181 so that it will seal all of the detector holes 31 to 38 except where there is a hole punched through the tape, for instance the hole 199 aligned between the detector hole 33 and the hole 193. By using the tape 198, the shaft can be rotated to the position corresponding with the selection of the detector holes 31 to 38 determined by the punching of holes in the tape 198. The latter can be driven pneumatically in increments by any suitable pneumatic means, such as a pneumatic piston working a ratchet and pawl drive to the tape 198, and the pneumatic means could conveniently be actuated by arranging for the last detector hole (corresponding to port 62) to be always connected with an unblocked detector hole and for the corresponding port 109 to operate the piston for driving the ratchet and pawl for feeding the tape to the next station. This piston would also be arranged to block the last detector hole when the tape has been moved to the next station so that the radial passage 66 will be connected to the next port 51. In this manner, for each station of the tape 198, the radial passage 66 will effectively scan across the detector holes until an aligned hole in the tape is encountered, at which time the corresponding spool valve 10 will be operated to energize the pneumatic apparatus for performing the function signified by the hole in the tape. On the completion of this function the corresponding hole 191 to 197 will be blocked so that the shaft 65 will be repeat indexed until the passage 66 is connected to another unblocked detector hole. Thus the shaft 65 will be repeat indexed for the passage 66 to scan across the detector holes 31 to 37 at each station of the tape 198 and, after each scanning operation has been completed, the tape 198 will be fed onto the next station in readiness for the next scan. Furthermore, each hole encountered in the tape will cause a corresponding spool valve 10 to be operated, thereby energizing the associated pneumatic apparatus to perform the function signified by the respective hole, and the completion of the function will cause the hole to be blocked so that the scanning procedure will continue until another hole in the tape is encountered.

There is, however, another factor involved in the repeat indexing operation. With the apparatus illustrated in FIG. 5, the passage 92 will be connected sequentially to the ports 101 to 112 even though the shaft 65 is repeat indexed, and the only influence repeat indexing will have on the supply of compressed air through the supply line 93 to the ports 101 to 112 is that the connections will only last for a very short period during a repeat indexing operation. During this short period of connection between the supply line 93 and any of the ports 101 to 112 during a repeat indexing operation there is the danger of sufficient air passing to operate a spool valve 10 that is not required. For this reason we prefer to introduce a time delay into the supply of compressed air from the supply line 93 so as to give time for the shaft 65 to be repeat indexed. This time delay may be achieved by means of a flow restrictor in the supply line 93 or by means of an inhibitor valve 182 arranged in the supply line 93 and operated whenever the air pressure rises in the line 71. The inhibitor valve 182 has a valve spool 183 which is urged by a compression coil spring 184 towards the left in FIG. 5 so that compressed air may flow freely through the supply line 93 to whichever of the ports 101 to 112 is connected to the radial passage 92. Whenever a pressure signal occurs in the line 71 marking the closing of, say, the detector hole 33 and signifying that the next machine operation should be initiated, the pressure signal will pass from the line 71 along a line 185 and through a non-return valve 186 to urge the valve spool 183 against the spring 184 to prevent the passage of compressed air along the supply line 93. The same pressure signal will also cause the piston 87 to make its indexing stroke to select the next detector hole 34 which is blocked and gives an immediate compressed air signal along the lines 71 and 185 to cause repeat indexing and to maintain the blockage of the supply line 93 by the valve spool 183. A slight complication in this operation is caused by the fact that the pressure in the lines 71 and 185 will drop momentarily during indexing due to the operation of the slide valve 176 so that the indexing pawl 89 will be re-cocked. This side effect is prevented from disturbing the function of the inhibitor valve 182 by the non-return valve 186 which prevents the pressure drop in the line 185 from being applied to the valve spool 183 which is arranged to exhaust through a timing restrictor 187. In this manner, the valve spool 183 will remain in its blocking position whenever a momentary drop in pressure occurs in the line 71 to re-cock the indexing pawl 89 during repeat indexing conditions, but will be returned by the spring 184 to its unblocking position due to the decay of air pressure through the timing restrictor 187 if the indexing operation connects the line 71 to an open detector hole 31 to 37.

Another important aspect of the repeat indexing feature is that a basic selector unit having, for instance, twelve ports 51 to 62 as shown in FIG. 5 may be used in cases where fewer detector holes are required. All that is necessary is the permanent blocking of the unwanted ports and, if desired, the corresponding ports 101 to 112 to prevent unnecessary wastage of compressed air.

FIG. 6 illustrates an alternative construction of the slide valve 176 for effecting repeat indexing. Instead of providing the radial pin 175, the rivet 157 is extended through a slot 200 in the cylinder 81 to operate the slide valve 176 which is biased into a slot 201 formed in the cylinder 81 by means of a compression coil spring 202 reacting against a bracket 203 secured to the cylinder 81. The line 179 extends through a sleeve 204 supported by the bracket 203, and also extends coaxially through the spring 202 which engages a radial flange 205 formed integral with the line 179 thereby ensuring a good sealing contact between the flange 205 and the slide valve 176. As with the embodiment shown in FIG. 5, the movement of the piston 87 to operate the pawl 89 causes the rivet 157 to move relatively to the slide valve 176 until the lost motion is taken up towards the end of the piston stroke and the slide valve 176 is moved to connect the line 179 to exhaust through the then aligned port 180.

What we claim as our invention and desire to secure by Letters Patent of the United States is:

1. A control circuit for effecting the sequential operation of machine elements, comprising a plurality of fluid operable selectively energizable sensing means for detecting from each machine operation when the next machine operation is to be initiated and producing a corresponding fluid pressure signal, a first selector means responsive to a sensing means produced fluid pressure signal for sequential indexing to a variety of positions such that in each indexed position the first selector means selects only one sensing means for energization, the indexed position of the first selector means taken sequentially corresponding with the selection of the sensing means in the required sequence, a second selector means responsive to a sensing means produced fluid pressure signal for sequential indexing to a variety of positions such that in each indexed position the second selector means selects at least one machine element for operation, the indexed positions of the second selector means taken sequentially corresponding with the operation of the machine elements in the required sequence, and a fluid pressure controlled indexing means for indexing the first and second selector means sequentially through their indexed positions, each sensing means producing a fluid pressure signal corresponding to the detection that the next machine operation is to be initiated when the sensing means is in a blocked circuit condition, the indexing means being operable whenever a sensing means is in a blocked circuit condition in which it produces a fluid pressure signal corresponding to the detection that the next machine operation is to be initiated whereby the first and second selector means will be indexed to their next sequential indexed positions for initiating the next machine operations and for energizing the next sensing means in the sequence and also to de-energize the sensing means that produced the signal.

2. A control circuit, according to claim 1, in which the second selector means when indexed from a first position to a second position terminates the operation of a machine element that was operating while the second selector means was at its said first position.

3. A control circuit, according to claim 1, in which each sensing means is a closable exhaust outlet selectively blocked when a machine element is in a position in which the sensing means detects when the next machine operation is to be initiated, a low pressure fluid supply source, the first selector means connecting the low pressure fluid supply source sequentially to the outlets, a valve means selectively actuated when a fluid pressure signal of a predetermined pressure is received, the valve means operating the indexing means, and the low pressure fluid supply source actuating the valve means whenever a selected outlet is blocked such that the pressure of the low pressure fluid supply will increase to the aforesaid predetermined pressure.

4. A control circuit, according to claim 3, in which at least one exhaust outlet is constituted by a plurality of outlets which are arranged so that all are to be covered by the respective machine elements while connected to the low pressure fluid supply before the pressure of the latter can attain the said predetermined pressure.

5. A control circuit, according to claim 1, control valves respectively operatively associated with the machine elements, operation of the machine elements being controlled by the respective control valves selectively actuated when a fluid pressure signal is received, a fluid pressure supply, the second selector means selectively applying a fluid pressure signal from the fluid pressure supply sequentially to the control valves.

6. A control circuit, according to claim 5 in which the control valves are reversing valves first and second ducts communicating each reversing valve and the second selector means and each reversing valve being operable to one condition when a fluid pressure signal is applied from the second selector means through the first duct and to the reverse condition when a fluid pressure signal is applied from the second selector means through the second duct.

7. A control circuit, according to claim 1, in which the first and second selector means are drivingly interconnected and the indexing means is a single indexing mechanism for indexing the first and second selector means as a single unit.

8. A control circuit, according to claim 7, in which the indexing mechanism comprises a ratchet for moving the first and second selector means through their indexed positions, a pawl for indexing the ratchet, and a fluid-operable actuator for reciprocating the pawl such that each reciprocation provides one indexing movement.

9. A control circuit, according to claim 1, including a greater number of sensing means than there are machine elements to be controlled with at least one of said sensing means being redundant in that there is no machine element for it to control, the redundant sensing means being permanently operated to a blocked circuit condition producing a fluid pressure signal as soon as it is energized by said first selector means and consequently operate the indexing means to index the first and second selector means to their next indexed positions.

10. A control circuit, according to claim 1 wherein the first selector means has more indexed positions than are required for connection to the sensing means, the indexing means being arranged to repeat index the first and second selector means past the redundant indexed positions.

11. A control circuit, according to claim 1, in which the first and second selector means are provided by a fluid distribution valve which includes a spindle supporting a rotor, a first passage formed in the spindle and communicating with a first annular gallery defined between the spindle and the rotor, a second passage formed in the spindle and communicating with a second annular gallery defined between the spindle and the rotor and axially spaced from the first annular gallery, sealing means inhibiting the leakage of fluid from the two annular galleries between the rotor and the spindle, a non-rotary member defining first and second circular series of spaced ports, a first passage formed in the rotor and communicating between the first annular gallery and any selected port of the first series, a second passage formed in the rotor and communicating between the second annular gallery and any selected port of the second series, further sealing means arranged operatively between the rotor and non-rotary member for inhibiting fluid leakage from the first and second rotor passages between the rotor and the non-rotary member, the first spindle passage together with the first annular gallery and the first rotor passage and the first series of ports constitute the first selector means, the second spindle passage together with the second annular gallery and the second rotor passage and the second series of ports constitute the second selector means, and the said indexing means being arranged to rotate the rotor relatively to the non-rotary member in angular increments for connecting the first and second passages respectively to different ports in the first and second series.

12. In a method of effecting the sequential operation of machine elements having respective associated fluid operable sensing means for detecting from each machine operation when the next machine operation is to be initiated and for producing a corresponding fluid pressure signal, the steps of energizing at any instant only the sensing means that is to initiate the next machine operation, applying a fluid pressure signal produced by the energized sensing means to initiate the operation of the machine element for performing the next machine operation in the sequence and to energize the next sensing means in the sequence and also to de-energize the sensing means that produced the fluid pressure signal, whereby each sensing means will be energized in turn in a predetermined desired sequence corresponding with the sequence of operations that the machine elements are to perform, and the sensing means are operable into an open circuit condition in which fluid is exhausted and the machine element is operated, applying the fluid pressure signal produced by each sensing means in the blocked circuit condition to operate an indexing device for causing the operation of the next machine element, for energizing the next sensing means in the sequence, and for de-energizing the sensing means that produced the signal, including applying each fluid pressure signal to operate the indexing mechanism thereby disconnecting the supply of fluid pressure from the sensing means that produced the fluid pressure signal and connecting the supply of fluid pressure to the next sensing means in the sequence.

* * * * *